United States Patent
Li et al.

(10) Patent No.: US 8,982,779 B2
(45) Date of Patent: Mar. 17, 2015

(54) PROVIDING SPACE DIVISION MULTIPLE ACCESS IN A WIRELESS NETWORK

(75) Inventors: Xiao-Dong Li, Ottawa (CA); Peter M. Deane, Fitzroy Harbour (CA); Patrick Lie Chin Cheong, Kanata (CA); Neil McGowan, Stittsville (CA); Ming Jia, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 633 days.

(21) Appl. No.: 12/602,721

(22) PCT Filed: Jul. 16, 2008

(86) PCT No.: PCT/IB2008/003365
§ 371 (c)(1),
(2), (4) Date: Dec. 2, 2009

(87) PCT Pub. No.: WO2009/037580
PCT Pub. Date: Mar. 26, 2009

(65) Prior Publication Data
US 2010/0173639 A1 Jul. 8, 2010

Related U.S. Application Data

(60) Provisional application No. 60/950,007, filed on Jul. 16, 2007.

(51) Int. Cl.
H04W 4/00 (2009.01)
H04B 7/06 (2006.01)
H04W 74/00 (2009.01)

(52) U.S. Cl.
CPC .............. *H04B 7/0695* (2013.01); *H04B 7/061* (2013.01); *H04W 74/00* (2013.01)
USPC .......................... 370/328; 370/342; 455/450

(58) Field of Classification Search
USPC ................. 370/329, 342, 442–444, 431–441, 370/347–359; 455/452.2, 434, 562
See application file for complete search history.

(56) References Cited

U.S. PATENT DOCUMENTS 6,289,005 B1 9/2001 Katz
6,701,165 B1 3/2004 Ho
(Continued)

FOREIGN PATENT DOCUMENTS

WO WO 98/53561 A2 11/1998
WO WO 2005/107121 A1 11/2005
(Continued)

OTHER PUBLICATIONS

Third Generation Partnership Project, 3GPP TS 36.213 v8.3.0 (May 2008), "Evolved Universal Terrestrial Radio Access (E-UTRA)—Physical Layer Procedures", Release 8 (45 pages).
(Continued)

*Primary Examiner* — Iqbal Zaidi

(57) ABSTRACT

To provide space division multiple access in a wireless network, plural beams are transmitted within a cell segment. Different information sets are sent in the corresponding plural beams, where one or more of the information sets are detectable by a mobile station depending upon a location of the mobile station in the cell segment. An indication responsive to which of the different information sets is detected by the mobile station is received, and beam selection from among the plural beams is performed according to the received indication.

18 Claims, 3 Drawing Sheets

(56) References Cited

U.S. PATENT DOCUMENTS

| | | | |
|---|---|---|---|
| 6,850,741 B2 | 2/2005 | Lei | |
| 7,602,760 B2* | 10/2009 | Zeira | 370/342 |
| 7,826,471 B2* | 11/2010 | Wilson et al. | 370/442 |
| 8,144,666 B2* | 3/2012 | Wilson et al. | 370/334 |
| 2004/0213187 A1 | 10/2004 | Fujil | |
| 2006/0154667 A1* | 7/2006 | Seo et al. | 455/446 |
| 2006/0209980 A1 | 9/2006 | Kim | |
| 2007/0093271 A1 | 4/2007 | Hovers | |
| 2007/0099578 A1 | 5/2007 | Adeney et al. | |
| 2007/0243831 A1 | 10/2007 | Seki | |
| 2010/0118855 A1* | 5/2010 | Malladi | 370/342 |

FOREIGN PATENT DOCUMENTS

| | | |
|---|---|---|
| WO | WO 2007/027825 A2 | 3/2007 |
| WO | WO 2007/049760 A1 | 5/2007 |

OTHER PUBLICATIONS

Third Generation Partnership Project, 3GPP TS 36.211 v8.3.0 (May 2008), "Evolved Universal Terrestrial Radio Access (E-UTRA)—Physical Channels and Modulation", Release 8 (77 pages).

First Office Action in Chinese Application No. 2000880024775.5 dated Aug. 14, 2012.

Office Action in Japanese Application No. 2010-516614 dated Jul. 17, 2012.

Office Action in Japanese Application No. 2010-516614 dated Jan. 4, 2013.

Chinese Office Action dated May 9, 2013.

Office Action in Canadian Application No. 2,690,990 dated Nov. 13, 2014.

Office Action in Chinese Application No. 200880024775.5 dated Dec. 19, 2013.

* cited by examiner

CODEBOOK
| CODEBOOK INDEX | RANK | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | - |
FIG. 2
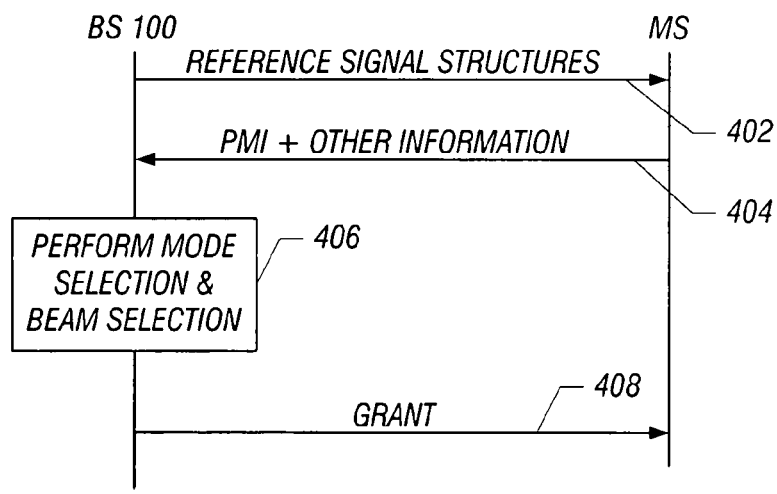
FIG. 4
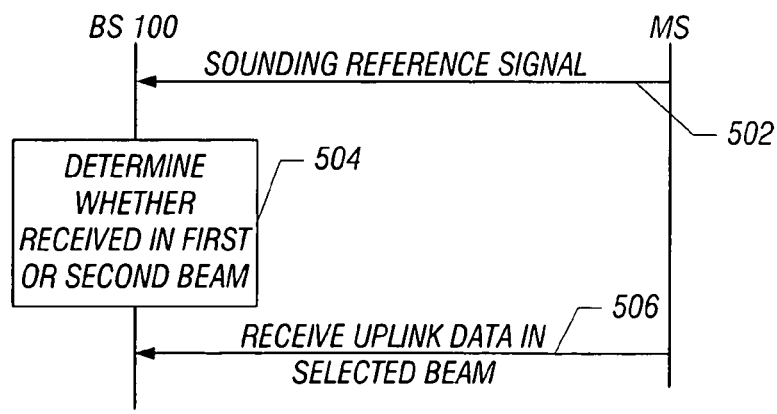
FIG. 5

PROVIDING SPACE DIVISION MULTIPLE ACCESS IN A WIRELESS NETWORK

This application is a U.S. National Stage Patent Application of International Application No. PCT/IB2008/00365, filed Jul. 16, 2008, which claims the benefit of U.S. Provisional Patent Application Ser. No. 60/950,007, filed Jul. 16, 2007, both of which are incorporated herein by reference.

TECHNICAL FIELD

The invention relates generally to providing space division multiple access (SDMA) in a wireless network.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

The 3GPP LTE standards have not yet developed efficient space division multiple access (SDMA) solutions. SDMA refers to a technique in which radio frequency (RF) resources (e.g., frequencies, time slots, etc.) can be reused in different geographic regions by transmitting different beams into the different geographic regions using multi-beam antennas. Because of inadequate SDMA solutions in the LTE standards, efficiencies associated with SDMA are not available in conventional LTE wireless networks.

SUMMARY OF THE INVENTION

In general, according to a preferred embodiment, a method of providing space division multiple access in a wireless network includes transmitting plural beams within a cell segment, and sending different information sets in the corresponding plural beams, where one or both of the information sets are detectable by a mobile station depending upon a location of the mobile station. Beam selection is performed from among the plural beams according to the received indication that is responsive to which of the plural information sets is detected by the mobile station.

Other or alternative features will become apparent from the following description, from the drawings, and from the claims.

BRIEF DESCRIPTION OF THE DRAWINGS

FIG. 2 illustrates an exemplary codebook containing codewords for encoding signals in corresponding beams of the wireless network, according to a preferred embodiment.

FIG. 4 is a flow diagram of a process of performing downlink beam selection according to a preferred embodiment.

FIG. 5 is a flow diagram of a process of performing uplink beam selection according to a preferred embodiment.

DETAILED DESCRIPTION OF PREFERRED EMBODIMENTS OF THE INVENTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
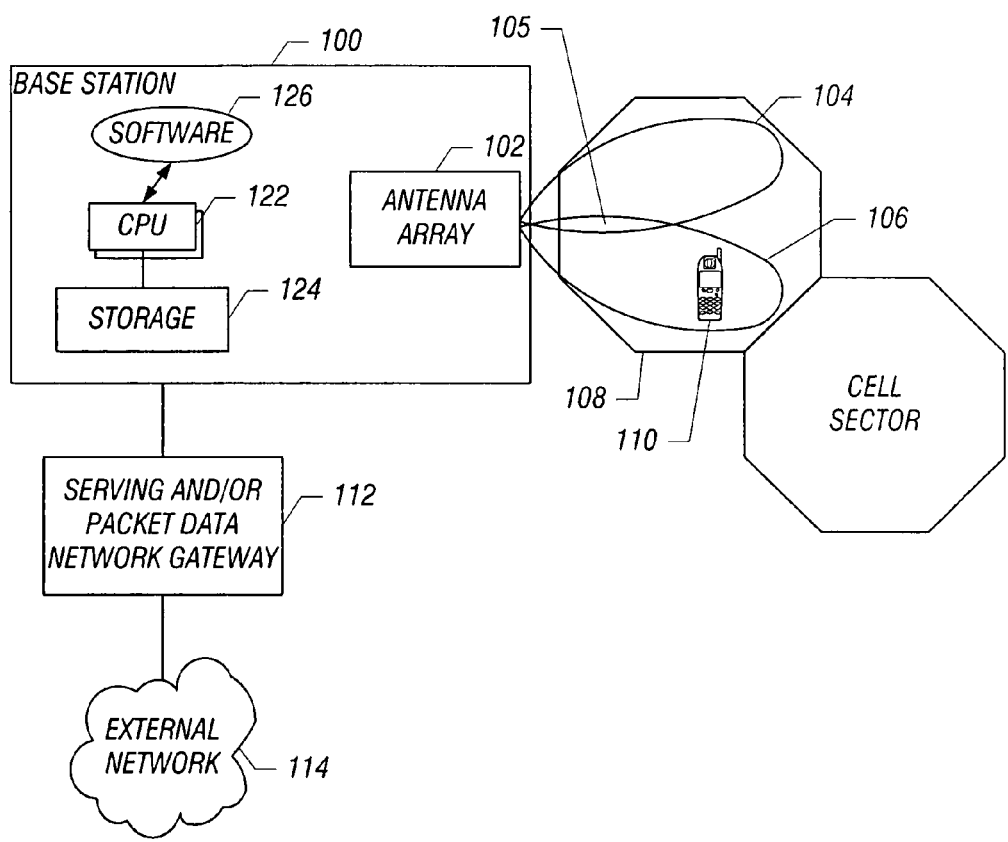
FIG. 1 is a block diagram of a communications network that includes a wireless network in which a space division multiple access (SDMA) technology is implemented, according to a preferred embodiment.

FIG. 1 shows an exemplary wireless network in which a spatial division multiple access (SDMA) mechanism according to preferred embodiments is provided. The wireless network includes a base station 100 that includes an antenna array or other assembly (multi-beam antenna) 102 for producing multiple beams (spatial beams) 104, 106 in a corresponding cell sector 108. Although just two beams 104 and 106 are depicted in FIG. 1, it is noted that more than two beams can be provided in a cell sector in other embodiments. SDMA enables radio frequency (RF) resources (e.g., frequencies, time slots, etc.) to be reused in different geographic regions of a cell sector by transmitting different beams into the different geographic regions using multi-beam antennas. A "beam" (or "spatial beam") refers to a wireless signal (or wireless signals) that is (are) transmitted along a particular geographic path. A beam pattern refers to the coverage area of the beam.

A cell sector is one section of a cell of a cellular network. In alternative implementations, rather than providing multiple beams in a cell sector, it is noted that multiple beams can be provided in a cell. As used here, a "cell segment" can refer to either a cell sector or a cell. To provide SDMA, multiple beams are generated in such a cell segment.

Although just one base station is depicted in FIG. 1, it is noted that a wireless network would typically include multiple base stations. In some implementations, the wireless network is a Long Term Evolution (LTE) wireless network as defined by the Third Generation Partnership Project (3GPP). In alternative implementations, other types of wireless networks can be employed. Note that reference to a "LTE wireless network" refers to a wireless network defined by current standards for LTE, or by subsequent standards that evolve from LTE. Moreover, even though reference is made to LTE wireless networks in the ensuing discussion, it is noted that techniques according to preferred embodiments can also be applied to non-LTE wireless networks.

A mobile station 110 can communicate using one or both of the beams 104, 106 in the cell sector 108, depending upon the position of the mobile station 110 in the cell sector. As depicted, the mobile station 110 is in a position to communicate using beam 106. The mobile station 110 can move to another location in the cell sector 108 to communicate using beam 104. Alternatively, the mobile station 110 can move to a location that is in an overlap region 105 between the beams 104 and 106, in which case the mobile station 110 is able to communicate using both beams 104 and 106.

In an LTE wireless network, the base station 100 includes an enhanced node B, which includes a base transceiver station that includes the antenna array 102. The base station 100 also includes a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple node Bs, or alternatively, a node B can be accessed by more than one radio access controller.

As depicted in FIG. 1, the base station 100 includes one or more central processing units (CPUs) 122, which is (are) connected to storage 124. Moreover, the base station includes software 126 that is executable on the CPU(s) 122 to perform tasks of the base station 100, including tasks according to preferred embodiments to enable support for SDMA in the LTE wireless network.

The base station 100 is connected to a serving and/or packet data network (PDN) gateway 112, which terminates the user plane interface toward the enhanced node B and assumes the responsibility for package routing and transfer towards an external network 114, which can be a packet data network such as the Internet or other type of network.

The arrangement depicted in FIG. 1 is provided for purposes of example. In other implementations, other wireless network arrangements are used.

In accordance with preferred embodiments, to enable downlink beam selection, the base station 100 is able to send different information sets on corresponding beams (e.g., 104, 106) in the cell sector 108 for receipt by mobile stations within the cell sector 108. Downlink beam selection refers to selection of one of the beams 104, 106 (or both beams 104, 106) depending upon the location of the mobile station to perform communication of downlink data (from the base station 100 to the mobile station). The downlink beam selection for a particular mobile station (e.g., 110) is performed at the base station 100 in response to indications received from the particular mobile station, where the indications are generated by the particular mobile station depending upon which of the information sets was received by the mobile station.

For example, the mobile station 110 located in a region corresponding to beam 106 would receive the information set transmitted in beam 106, but will not receive the information set transmitted in beam 104. On the other hand, a mobile station located in a region corresponding to beam 104 would receive the information set communicated in beam 104, but would not receive the information set communicated in beam 106. A mobile station located in an overlap region 105 between the beams 104 and 106 would be able to receive both information sets communicated in beams 104, 106.

Depending on the information set(s) detected by the mobile station, the mobile station will send back a corresponding indication to the base station 100. The indication sent by the mobile station will differ depending on which of the information set(s) is detected by the mobile station. Based on the indication received from the mobile station, the base station 100 performs beam selection from among plural beams for communicating downlink data to the mobile station. The indication received by the base station 100 from the mobile station enables the base station 100 to identify the beam that the mobile station is able to receive in the downlink direction.

According to preferred embodiments, the SDMA operation supported by the LTE wireless network is transparent to the mobile station. In other words, changes do not have to be made to mobile stations in the LTE wireless network to provide SDMA support, which reduces costs associated with deploying SDMA. The mobile station is able to detect the information sets communicated by the base station—however, the mobile station does not have to recognize that the information sets were sent in different beams, and the mobile station does not have to be configured to identify which beam the mobile station is communicating with.

In preferred embodiments, the information sets communicated in the beams 104, 106 include reference signal structures that contain pilot (reference) signals that are coded according to a predetermined coding scheme. A pilot (reference) signal is a signal that is transmitted by the base station and is used by a mobile station to acquire the wireless network system and to perform other tasks. In some embodiments, the predetermined coding scheme involves the use of a codebook that has a number of entries containing corresponding codewords that can be selectively used for coding the pilot signals in a reference signal structure.

In some implementations, each information set communicated in each of the beams 104, 106 includes all pilot signals of the cell sector 108. Thus, for example, if the base station 100 transmits two pilot signals in the cell sector 108, then both pilot signals would be communicated in each information set communicated in each corresponding beam 104, 106. However, different codings (using different codewords of the codebook) are applied to the pilot signals in the different information sets, such that a mobile station in a region corresponding to beam 104 would receive an information set containing pilot signals subjected to a first coding (using a first codeword), while a mobile station in a region corresponding to beam 106 would receive an information set with pilot signals subjected to a second, different coding (using a second codeword).

FIG. 2 shows an exemplary codebook that has a number of entries containing exemplary codewords. The codebook is arranged as a matrix having rows corresponding to four codebook indexes (0, 1, 2, 3), and two columns corresponding to two ranks (1, 2). The arrangement of FIG. 2 is provided for purposes of example, as the actual data structure of the codebook may be different. There are four entries (containing four respective codewords) corresponding to rank 1 and three entries (containing three respective codewords) corresponding to rank 2. "Rank 2" indicates that a particular wireless channel used to communicate data between a base station and a mobile station is able to use two layers, which means that the current RF channel between the base station and the particular mobile station can support two layers (and in a preferred implementation) these two layers will utilize both beams 104, 106 simultaneously. This simultaneous transmission of data to the mobile station means that the throughput of data communication is doubled. On the other hand, "rank 1" means that just a single layer can be used for the wireless channel that communicates data between the base station and mobile station. If just a single layer is enabled, then the data transmitted to a mobile station is transmitted in just one of the beams 104, 106. Note that rank 2 is possible when a mobile station is located in an overlap region, such as overlap region 105, between multiple beams (e.g., 104, 106).

The entry in the codebook identified by codebook index 0 and rank 1 has the following value, $$\frac{1}{\sqrt{2}}\begin{bmatrix}1\\1\end{bmatrix},$$

which means that a first pilot signal and second pilot signal are transmitted in the same positive phase (corresponding to the "+1" value).

On the other hand, the codeword contained in the entry of the codebook identified by codebook index 1 and rank 1 has value $$\frac{1}{\sqrt{2}}\begin{bmatrix} 1 \\ -1 \end{bmatrix},$$

which means that the first pilot signal has positive phase while the second pilot signal has negative phase (which correspond to the "+1" and "−1" values, respectively, of the codeword).

The codeword corresponding to the entry associated with codebook index 2 and rank 1 has value $$\frac{1}{\sqrt{2}}\begin{bmatrix} 1 \\ j \end{bmatrix},$$

which means that the first pilot signal has positive phase (corresponding to the "+1" value), while the second pilot signal is out of phase by 90 degrees (corresponding to the "j" value).

The codewords associated with the rank 2 entries in the codebook are interpreted similarly, except that the pilot signals subjected to rank 2 coding are communicated over two beams, rather than just one beam as with pilot signals subjected to rank 1 coding.

Figure 3A:
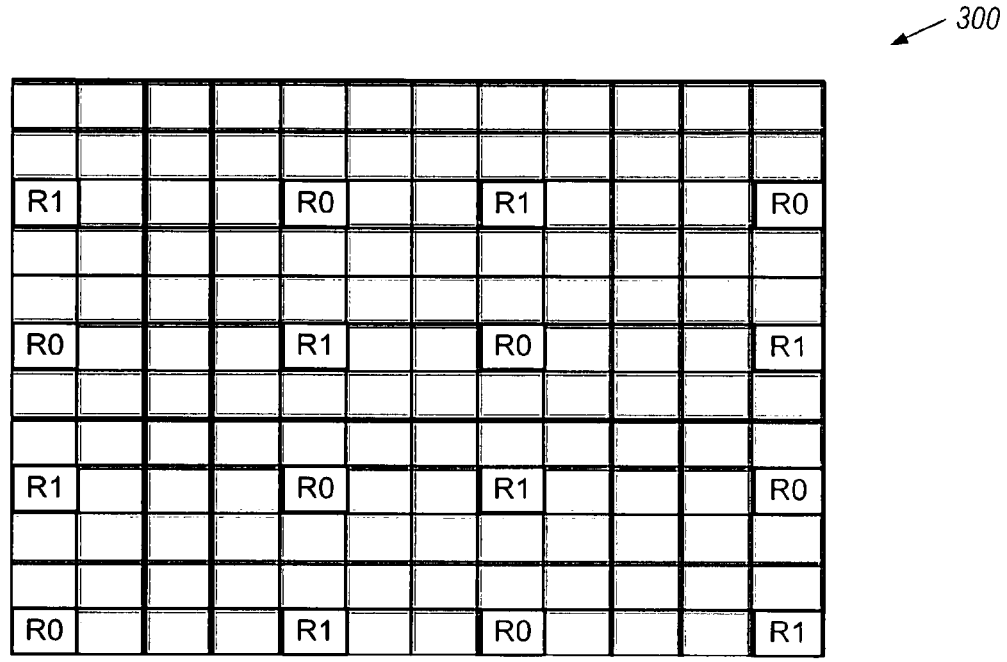
FIGS. 3A-3B illustrate exemplary reference signal structures that each contains pilots coded according to different precoding matrix index values, according to a preferred embodiment.
Figure 3B:
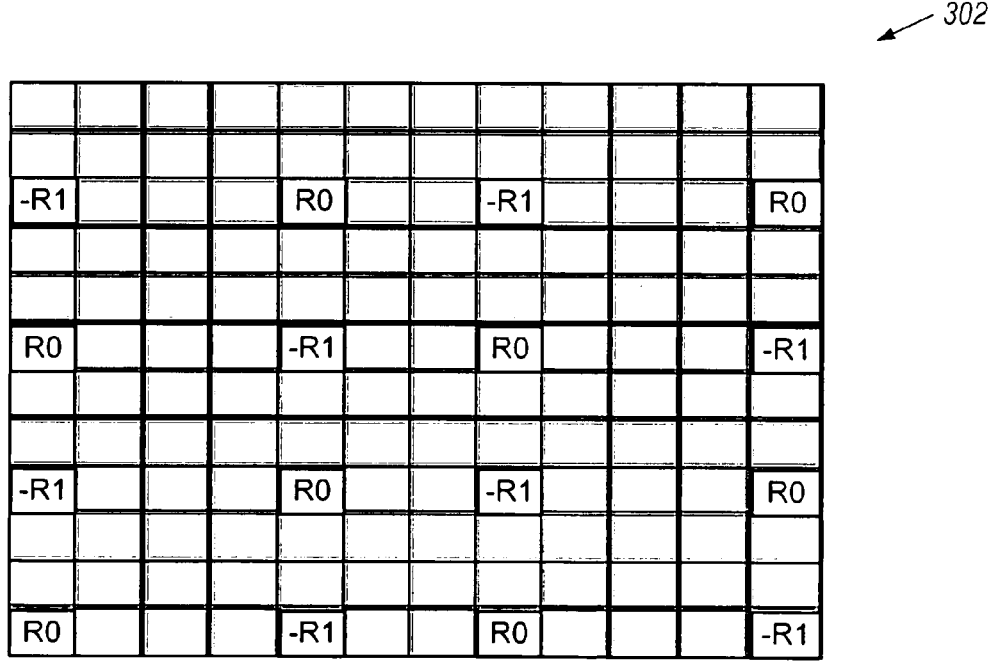

FIGS. 3A-3B depict two different information sets, in the form of reference signal structures 300 and 302, that are communicated over different beams (e.g., 104, 106). The horizontal axis of each of the reference signal structures 300, 302 represent time slots, whereas the vertical axis of each of the reference signal structures 300, 302 represent subcarriers (at different frequencies). FIG. 3A shows a reference signal structure in which the coding applied to pilot signals (represented as R0 and R1) are subjected to coding applied by the codeword contained in the codebook entry corresponding to codebook index 0 and rank 1. FIG. 3B shows a reference signal structure in which the coding applied to pilot signals (represented as R0 and R1) are subjected to coding applied by the codeword contained in the codebook entry corresponding to codebook index 1 and rank 1.

The reference signal structures 300 and 302 differ in that pilot signal R1 in reference signal structure 300 has a +1 phase (according to the codeword at codebook index 0, rank 1), while pilot signal R1 in reference signal structure 302 has a −1 phase (according to the codeword at codebook index 1, rank 1). The R0 pilot signal occupies the same positions in both reference signal structures 300 and 302, and the R0 pilot signal has the same +1 phase in both reference signal structures 300, 302. However, the R1 pilot signals occupy the same positions in the reference signal structures 300 and 302, but are out of phase by 180° in the reference signal structures 300 and 302.

The indication that is reported by the mobile station back to the base station 100 depends upon which reference signal structure is detected by the mobile station. In other words, if a first information set is detected by the mobile station, then a first indication is sent. However, if a second information set is detected by the mobile station, then a second indication is sent. If a combination of the first and second information sets (e.g., reference signal structures corresponding to either beam 1 or beam 2) are received by the mobile station, then depending on the relative strength of the two sets, either the beam corresponding to the stronger set will be indicated by the mobile station or if the signals are of comparable strength then a third indication may result that does not correspond to either beam.

In some preferred embodiments, the indication reported by the mobile station is a precoding matrix index (PMI). In an exemplary implementation, a mobile station that is exclusively in a region corresponding to beam 1, with no significant interference from beam 2, will report a first PMI, such as $$\begin{bmatrix} 1 \\ 1 \end{bmatrix},$$

which corresponds to the codeword at codebook index 0, rank 1. On the other hand, a mobile station that is located exclusively in beam 2 (with no significant interference from beam 1) will report the second PMI, such as $$\begin{bmatrix} 1 \\ -1 \end{bmatrix},$$

which corresponds to the codeword at codebook index 1, rank 1. In some cases, the mobile station can report another rank 1 PMI, such as $$\begin{bmatrix} 1 \\ j \end{bmatrix} \text{ or } \begin{bmatrix} 1 \\ -j \end{bmatrix}.$$

If such other rank 1 PMI is reported, then that indicates that the mobile station can see more than one beam. In this scenario, a diversity mode is employed in which the same data is multiplexed using both beams (employing either time diversity, space diversity, block code diversity or some combination of these methods) to the mobile station. In one implementation, the diversity mode used is a spatial frequency block coding (SFBC) mode. A mobile station can see both beams if the mobile station is in an overlap region (e.g., 105 in FIG. 1) between the two beams.

If the mobile station detects that an RF channel can support two layers, and if the mobile station is in the overlap region (e.g., 105) between two beams, then the mobile station can report a rank 2 PMI, such as PMIs corresponding to one of the codewords depicted in the codebook of FIG. 2. In such a scenario, the base station will use a MIMO (multiple input multiple output) mode, in which both beams are used for simultaneously communicating different data to the mobile station, to improve throughput.

FIG. 4 is a message flow diagram of a procedure to perform downlink beam selection by the base station 100. The base station transmits (at 402) reference signal structures in corresponding beams in a given cell sector. Depending on where the mobile station is located, the mobile station can receive one of the beams, or the other of the beams, or both of the beams (assuming that there are two beams). Note that in alternative implementations, more than two beams can be transmitted by the base station.

Based on the reference signal structures detected by the mobile station, the mobile station sends (at 404) a PMI back to the base station 100. Note that the mobile station can also send other information back to the base station, where such other information can include metrics representing beam quality. For example, a metric representing beam quality can be in the form of a channel quality indicator (CQI). The other information transmitted by the mobile station back to the base station can also include rank information (e.g., rank 1 or rank 2) to indicate the number of layers supported by an RF channel over which the mobile station is communicating. The PMI, CQI, and rank information can be sent by the mobile station to the base station 100 in one control message, or in plural control messages. For example, the PMI, CQI, and rank information can be communicated in a physical uplink control channel (PUCCH), or in some other control channel.

Based on the received PMI and other information, the base station 100 can perform (at 406) downlink beam selection. Beam selection can include the base station selecting one of the beams, or the other of the beams, or both beams, for communicating downlink data with the mobile station. The PMI informs the base station 100 the beam(s) that the mobile station is able to see. The CQI information informs the base station 100 of the quality of the beam(s) detected by the mobile station, and the rank information informs the base station 100 of the number of layers supported by the current RF channel. Using the above information, the base station 100 is able to select the beam(s) for use in transmitting downlink data.

Beam selection also involves selecting the mode in which the base station is to communicate downlink data with the mobile station, where the mode can be a single input multiple output (SIMO) mode (in which one beam is used for communicating with each mobile station—note that multiple beams can be used for communicating downlink data to multiple mobile stations). Another mode of operation is a diversity mode, or SFBC mode, in which the same data is sent in multiple beams but in different phases to improve communication performance and cell coverage improvement. Another possible mode is MIMO mode, in which different data is transmitted to a mobile station simultaneously on different beams to improve per-user throughput. Mode selection is also based on the PMI, CQI and rank information.

Note that the beam and mode selection (406) can be performed by a downlink scheduler (part of software 126 in FIG. 1) in the base station 100.

Based on the selected mode and beam selection performed at 406, the base station sends (at 408) a downlink scheduling grant message to the mobile station, where the grant message can contain a field to indicate the mode of operation (e.g., MIMO mode, SIMO mode, or SFBC mode). The grant message will also indicate which codeword that the mobile station is to use. For example, the grant message can contain a particular field that can have: (1) a first value to indicate SIMO mode with a first codeword applied to downlink data sent in the first beam, (2) a second value to indicate SIMO mode with a second codeword applied to downlink data in the second beam, (3) a third value to indicate SFBC mode to perform transmit diversity, and (4) a fourth value to indicate MIMO mode with a corresponding rank 2 codeword.

The above has described a technique for enabling the base station 100 to (1) identify, for downlink data communication, the beam that a mobile station is able to receive, and (2) select the beam(s) that the base station is to use for transmitting downlink data.

In preferred embodiments, to enable the base station to determine which beam the mobile station will be using for uplink data (from the mobile station to the base station 100), the mobile station sends an uplink reference signal. In one example, this uplink reference signal is referred to as a sounding reference signal. As depicted in FIG. 5, the mobile station sends (at 502) a sounding reference signal to the base station 100. The base station 100 then determines (at 504) whether the mobile station transmitted the sounding reference signal in the first beam or second beam, so that the base station can select the appropriate beam to receive (at 506) uplink data from the mobile station.

The base station 100 can include an uplink scheduler (part of software 126) to perform scheduling for communication of uplink data by the mobile stations in the cell sector 108. The uplink scheduler can perform the uplink beam selection either independently or jointly with the downlink scheduler. When the uplink and downlink schedulers work jointly, then the schedulers can confirm whether or not a mobile station is in a region of a beam. For example, if both the uplink and downlink schedulers select a particular beam for the mobile station, then that is an indication that the mobile station is definitely in the region corresponding to the particular beam. However, if the uplink and downlink schedulers select inconsistent beams for the mobile station, then the schedulers may have to perform further analysis to determine which of the beams is the correct one to select for both the uplink and downlink directions. Also, during handover between different base stations, both the uplink and downlink beam selections have to be considered.

In some exemplary embodiments, downlink control signals can be sent by the base station 100 as follows. For example, synchronization signals such as a primary synchronization channel (P-SCH) and secondary synchronization channel (S-SCH) can be sent on both beams 104, 106 using a diversity scheme, such as a precoding vector switching (PVS) transmit diversity scheme.

Other downlink control signals can be sent on both beams 104, 106 using SFBC diversity transmission. Examples of such other control signals include PCFICH (physical control format indicator channel), PHICH (physical hybrid automatic repeat request indicator channel), and PBCH (physical channel).

Another downlink control channel is the PDCCH (physical downlink control channel). If the number of mobile stations in a cell sector is not large (e.g., less than some predefined threshold), SFBC diversity transmission can be used by the base station 100 to send the PDCCH in both beams. However, if there are a relatively large number of mobile stations, the PDCCHs for different mobile stations can be sent in different beams, depending on the locations of the mobile stations. In one example, three groups of mobile stations located in a cell sector can be identified: (1) group 1: mobile stations in overlap region between two beams; (2) group 2: mobile stations in first beam area; and (3) group 3: mobile stations in second beam area. The first beam will be used by the base station 100 to transmit PDCCHs to mobile stations in groups 1 and 2, while the second beam will be used by the base station 100 to transmit PDCCHs to mobile stations in groups 1 and 3.

Another downlink control signal that can be sent using SFBC diversity mode is the random access response message that is sent by the base station to the mobile station in response to a random access channel (RACH) from the mobile station. RACH is sent by the mobile station to establish a call or other communications session.

Although reference is made to specific exemplary downlink channels in this discussion, it is noted that different implementations can use different control channels.

In some exemplary embodiments, uplink control signals can be received by the base station 100 as follows. The uplink random access channel (RACH) is received by the base station in both beams (so that no beam selection has to be performed). Also, the PUCCH can also be received by the base station in both beams, or the PUCCH can be received in either beam, where users in different beams can be assigned the same PUCCH resources, thus increasing PUCCH capacity (similar to uplink data).

Although reference is made to specific exemplary uplink channels in this discussion, it is noted that different implementations can use different control channels.

In some embodiments, for communication of uplink data or control signaling, two mobile stations are assigned the same resource block (same combination of time slot and subcarrier) in two different beams. For the base station 100 to be able to reliably receive the uplink data or control signaling in such a scenario, the base station 100 is able to assign two orthogonal demodulation reference signals to the mobile stations. The demodulation reference signal sent by one mobile station will not be shifted; however, the demodulation reference signal sent by the other mobile station will have a half-length cyclic shift applied. The demodulation reference signal and application of cyclic shift is described in the 3GPP 36.211 Specification. The orthogonal demodulation reference signals associated with the uplink data and/or control signaling from the mobile stations will enable the base station 100 to accurately determine the mutual RF interference or isolation of the mobile stations in the two beams.

The orthogonal demodulation reference signal to be used by each mobile station for uplink transmission is indicated by the base station in the uplink scheduling grant message. The grant message can include a parameter to indicate the cyclic shift to be applied to the uplink demodulation reference signal for multiuser-MIMO (MU-MIMO) mode. The parameter having a first value indicates no cyclic shift, whereas the parameter having a second value indicates a half length cyclic shift, to provide the orthogonal demodulation reference signals.

Instructions of the software described above, such as software 126 in the base station 100 of FIG. 1, can be executed on a processor. Software can also be executed by a processor in the mobile station 110 of FIG. 1. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing space division multiple access in a wireless network, comprising:
transmitting plural beams within a cell segment;
sending different information sets in the corresponding plural beams, wherein one or more of the information sets are detectable by a mobile station depending upon a location of the mobile station in the cell segment;
receiving an indication responsive to which of the different information sets is detected by the mobile station;
performing beam selection from among the plural beams according to the received indication;
sending a message to the mobile station, wherein the message indicates an amount of cyclic shift to apply to a demodulation reference signal;
receiving the demodulation reference signal from the mobile station having the amount of cyclic shift applied; and
if the amount of cyclic shift is none, sending a second message to a second mobile station, wherein the second message indicates a non-zero cyclic shift to be applied to a demodulation reference signal sent by the second mobile station.

2. The method of claim 1, where receiving the indication comprises:
receiving a first indication if a first of the information sets but not a second of the information sets is detected by the mobile station;
receiving a second indication if the second information set but not the first information set is detected by the mobile station; and
receiving a third indication if both the first and second sets are detected by the mobile station.

3. The method of claim 1, wherein receiving the indication comprises receiving a precoding matrix index.

4. The method of claim 1, wherein the transmitting, sending, receiving, and performing are performed by a base station in a Long Term Evolution (LTE) wireless network.

5. The method of claim 1, further comprising:
receiving, from the mobile station, one or more signal quality metrics associated with the corresponding plural beams,
wherein performing the beam selection is also according to the one or more signal quality metrics.

6. The method of claim 5, wherein receiving the one or more signal quality metrics comprises receiving one or more channel quality indications (CQIs).

7. The method of claim 1, wherein sending the different information sets comprises sending different reference signal structures, wherein each of the different reference signal structures has a same set of pilots.

8. The method of claim 7, wherein the different reference signal structures employ different phases for at least one pilot of the sets of pilots.

9. The method of claim 1, wherein performing the beam selection comprises performing downlink beam selection, the method further comprising:
receiving, by a base station, reference signals from the mobile station; and
determining, based on the reference signals by the base station, a beam from among the plural beams to communicate uplink data.

10. The method of claim 1, further comprising:
receiving rank information to indicate a number of layers supportable by a wireless channel; and
selecting a mode of operation based on the indication and rank information.

11. The method of claim 10, wherein selecting the mode comprises selecting from among a single input multiple output (HMO) mode, a diversity mode, and a multiple input multiple output (MIMO) mode.

12. A base station comprising:
an antenna assembly configured to generate plural beams to be communicated in a cell segment; and
a processor configured to:
transmit different information sets in respective beams to a mobile station in the cell sector, wherein the mobile station is able to detect one or more of the information sets depending upon a location of the mobile station in the cell sector;
receive an indication responsive to which of the different information sets is detected by the mobile station;
select one or more beams from among the plural beams according to the received indication for communicating downlink data to the mobile station;
send a message to the mobile station, wherein the message indicates an amount of cyclic shift to apply to a demodulation reference signal;
receive the demodulation reference signal from the mobile station having the amount of cyclic shift applied; and
if the amount of cyclic shift is none, sending a second message to a second mobile station, wherein the second message indicates a non-zero cyclic shift to be applied to a demodulation reference signal sent by the second mobile station.

13. The base station of claim 12, wherein the processor is further configured to:
receive rank information and beam quality metrics from the mobile station; and
select a mode from among plural modes for communicating the downlink data.

14. The base station of claim 13, wherein the selected mode is one of a single input multiple Output (SIMO) mode, diversity mode, and multiple input multiple output (MIMO) mode.

15. The base station of claim 12, wherein the processor is further configured to:
receive a sounding reference signal from the mobile station; and
determine which of the plural beams to use for communication of uplink data based on the received sounding reference signal.

16. The base station of claim 12, wherein the processor is configured to communicate certain control 2 signals to the mobile station in diversity mode.

17. An article comprising at least one computer-readable storage medium containing non-transitory instructions that when executed by a base station cause the base station to:
cause transmission of plural beams within a cell segment;
send different information sets in the corresponding plural beams, wherein one or more of the information sets are detectable by a mobile station depending upon a location of the mobile station in the cell segment;
receive an indication responsive to which of the different information sets is detected by the mobile station;
perform beam selection from among the plural beams according to the received indication;
send a message to the mobile station, wherein the message indicates an amount of cyclic shift to apply to a demodulation reference signal;
receive the demodulation reference signal from the mobile station having the amount of cyclic shift applied; and
if the amount of cyclic shift is none, sending a second message to a second mobile station, wherein the second message indicates a non-zero cyclic shift to be applied to a demodulation reference signal sent by the second mobile station.

18. The article of claim 17, wherein the non-transitory instructions when executed cause the base station to further select a mode for communicating data, wherein the selected mode is one of a single input multiple output (SIMO) mode, diversity mode, and multiple input multiple output (MIMO) mode.

* * * * *